United States Patent [19]

Reeves

[11] Patent Number: 4,553,887
[45] Date of Patent: Nov. 19, 1985

[54] DUNNAGE BAG

[75] Inventor: Robert L. Reeves, Sheridan, Ark.

[73] Assignee: St. Regis Corporation, New York, N.Y.

[21] Appl. No.: 520,175

[22] Filed: Aug. 4, 1983

[51] Int. Cl.4 .................................................. B60P 7/14
[52] U.S. Cl. ..................................... 410/119; 156/145;
156/226; 156/308.4; 383/3; 383/907; 428/35
[58] Field of Search .................... 383/3, 907; 410/117,
410/118, 119, 121, 122, 123, 124, 125, 126, 128,
154; 428/35; 156/145, 226, 308.4

[56]  References Cited
U.S. PATENT DOCUMENTS

| 1,708,413 | 4/1929 | Fowler | 410/123 |
| 2,764,105 | 9/1956 | Stiegel | 410/121 |
| 3,421,451 | 1/1969 | Brucks | 410/154 |
| 3,868,026 | 2/1975 | Baxter | 410/119 |
| 3,960,281 | 6/1976 | Reeves | 410/119 |
| 4,044,693 | 8/1977 | Ramsey, Jr. | 410/119 |
| 4,136,788 | 1/1979 | Robbins | 410/119 |
| 4,363,579 | 12/1982 | Rogers | 410/154 |
| 4,372,717 | 2/1983 | Sewell et al. | 410/154 |

Primary Examiner—Randolph A. Reese
Assistant Examiner—David F. Hubbuch
Attorney, Agent, or Firm—Joseph M. Maguire

[57]  ABSTRACT

An inflatable dunnage bag is formed by a flat, flexible triangular envelope constructed of heavy kraft paper and a sealed inner plastic liner which is inflatable through a valve. The bag is used for shoring load by standing it upright with its base topmost, horizontally oriented, and positioned adjacent the top of the load and its apex positioned contiguous to the bottom perimeter of the load.

12 Claims, 6 Drawing Figures

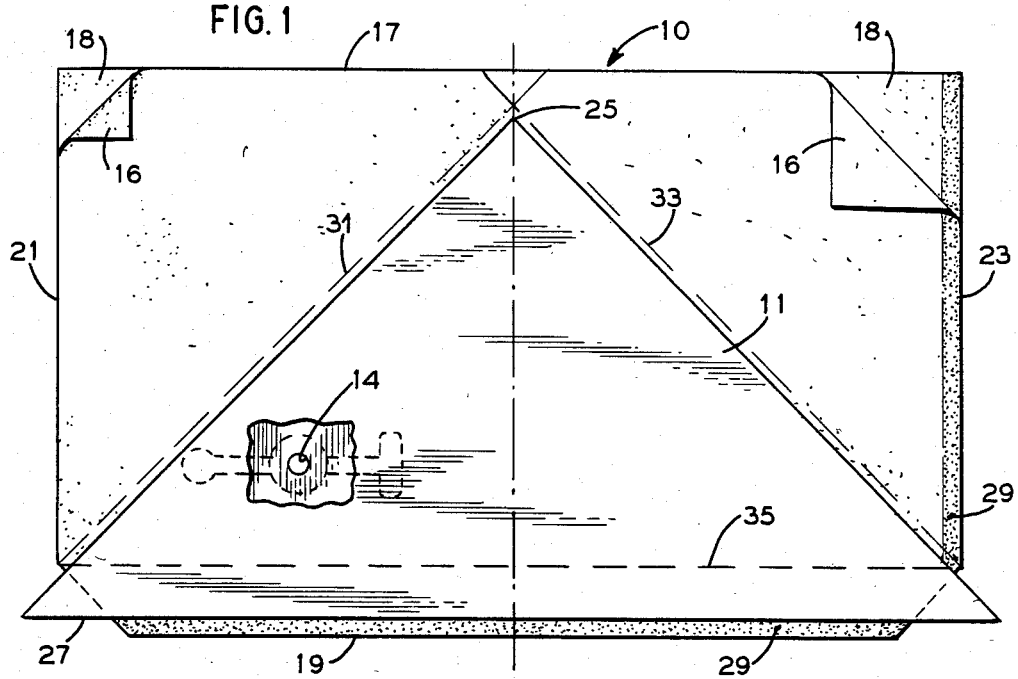
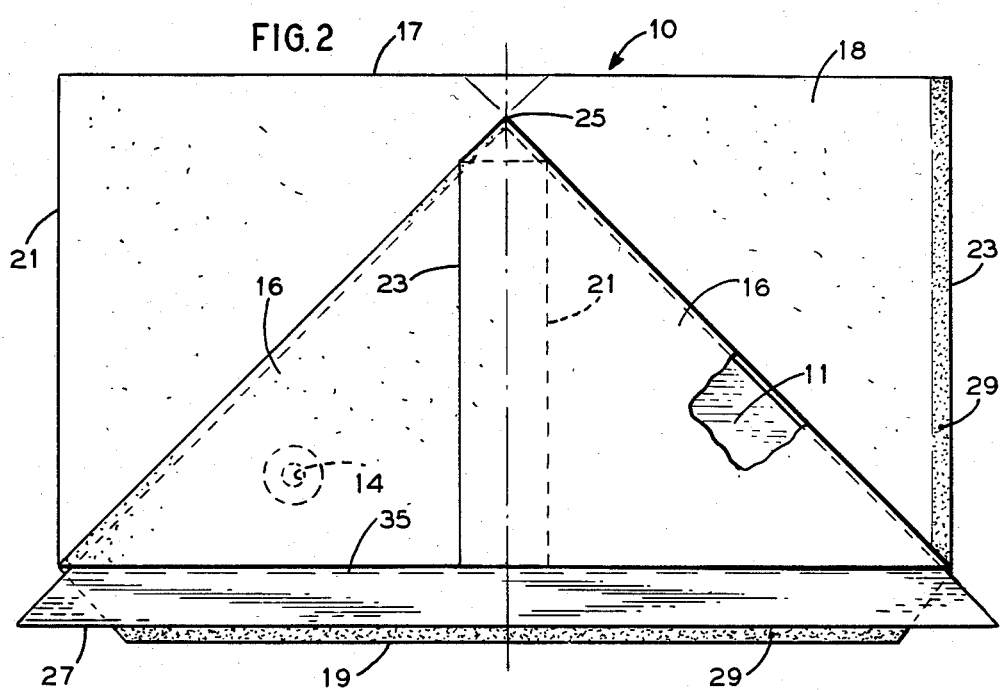

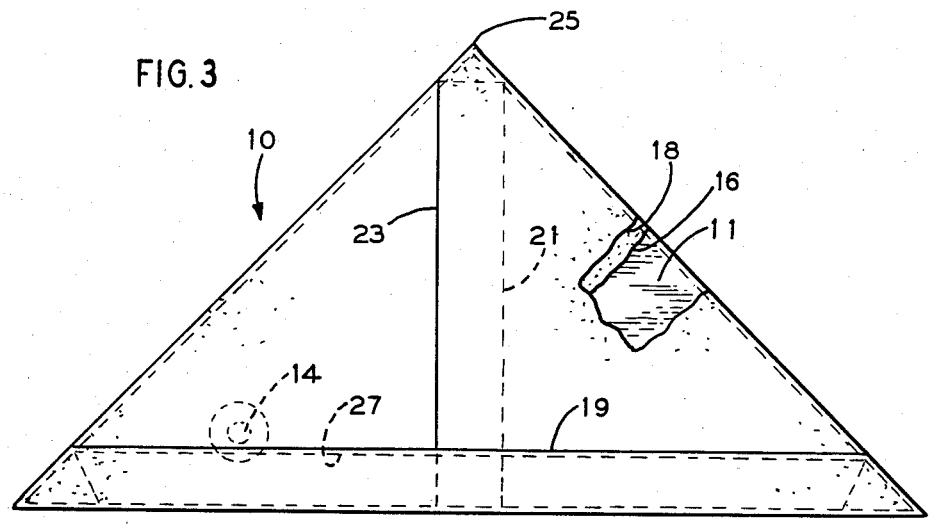
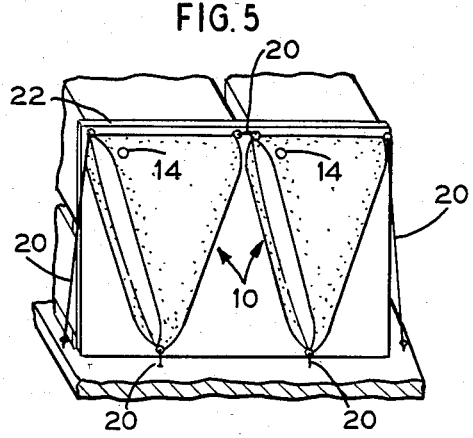
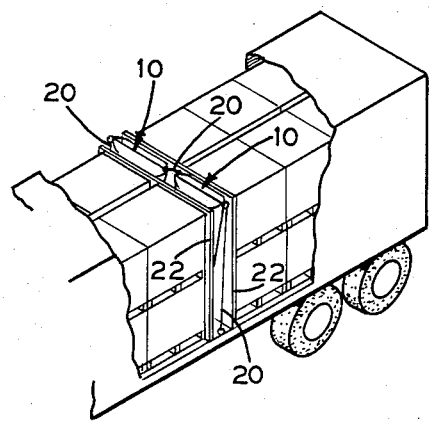
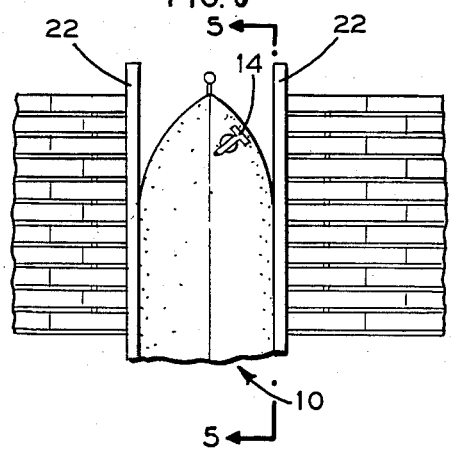

DUNNAGE BAG

BACKGROUND OF THE INVENTION

This invention relates in general to bags and, more particularly, to a multi-ply inflatable dunnage bag having a unique shape and construction and to a method of utilizing such a bag for shoring freight.

Dunnage bags of the type indicated are used between containers or pallets of freight in transporting vehicles to prevent shifting of the freight while in transit. Since such bags are subjected to repeated impact by the shifting freight, they must be of sound construction and have strong and durable closures.

In practice in recent years has been to utilize disposable, inflatable dunnage bags which may be deflated when the freight reaches its destination. Since such bags are used only once, the bags have been so constructed and formed as to minimize the cost thereof. Typically, such a dunnage bag is of rectangular configuration; is made for layers of kraft paper containing an inflatable plastic bladder, with the opposite ends of the bag formed with closures; and is used to ship a wide range of products from plywood to pet foods. When placed in the void between a shipper's lading and inflated with two to eight psi of compressed air, the bag exerts a strong force in either direction. This fills the void to prevent shifting during transit and provides an air cushion to help absorb shocks or vibrations.

An inflatable dunnage bag consists of two major assemblies. The first is the body of the bag, made of various plies of kraft paper. The paper supplies the strength to retain the air pressure and prevent stretching or enlarging of the bag walls as it is inflated. The second assembly is the plastic liner. This retains the volume of air and prevents leakage. The liner or air bladder is constructed of plastic film. The valve and liner ends must be carefully heat sealed to complete the airtight closure.

Common practice in the application of inflatable dunnage bags is to contact as much of the lading as possible without extending beyond the perimeter of the lading. Accordingly, both the height and width of the load is measured at the point where the bags are to be installed. These dimensions determine the number of bags needed. The bags are invariably of rectangular shape.

In operation, cross-wise and longitudinal shifting of the load mostly involves the upper part of the load because the combined frictional force between the lower part of the load and the vehicle floor, together with the weight of the upper part of the load on the lower part and the frictional force between the load and the walls of the vehicle, is sufficient to restrain or inhibit the lower part of the load from moving. In light of this load characteristic, I have determined that load compacting, cushioning, repositioning and enlarging can be achieved with an inflatable dunnage bag of triangular shape.

SUMMARY OF THE INVENTION

The general object of the present invention is the provision of an inflatable and disposable dunnage bag of triangular shape having the virtues of compactness, simplicity, reliability and ability to safely contain load shifting and to maintain product alignment, with a substantial reduction in the quantity of material required to form the bag and reduction in the area of the bag subject to failure.

In accordance with the invention, an inflatable dunnage bag is formed by a flat, flexible triangular envelope constructed of heavy kraft paper and a sealed inner plastic liner which is inflatable through a valve. The bag is used for shoring load by standing it upright with its base topmost, horizontally oriented, and positioned adjacent the top of the load and its apex positioned contiguous to the bottom perimeter of the load.

BRIEF DESCRIPTION OF THE DRAWINGS

FIG. 1 is a plan view of a liner positioned on top of plies of paper before folding of the paper to form the bag of the invention;

FIG. 2 is a view similar to FIG. 1 after folding two corners of the inner ply of paper;

FIG. 3 is a plan view of a completed bag;

FIG. 4 is a fragmentary perspective view showing a typical application of the bag of the invention;

FIG. 5 is a sectional view taken along the line 5—5 of FIG. 6; and

FIG. 6 is a partial side elevation of FIG. 4.

DESCRIPTION OF THE PREFERRED EMBODIMENT

The dunnage bag 10 of the invention is composed of an inflatable bladder 11 enclosed in bladder reinforcing material in the form of plies of paper. The bladder is formed by heat sealing together the edge surfaces of matching triangular pieces of heat sealable material, such as polyethylene, with one wall of the bladder having an opening for receiving the end of a valve 14 which is heat sealed to the bladder and is of the type shown in U.S. Pat. No. 4,044,693. Preferably, the bladder is in the shape of an isosceles triangle.

Bladder 11 is encased in plies 16 and 18 of reinforcing material superimposed, one over the other, and folded to conform to the shape of the bladder. Preferably, two or more plies are used and the material is kraft paper. Each ply is formed from a substantially rectangular sheet of paper having long sides 17 and 19 and short sides 21 and 23. In assembling the bag, bladder 11 is placed onto the inner ply 16 so that it apex 25 is positioned at the centerline and slightly inside of side 17 of ply 16 and its base 27 extends parallel to and slightly inside of side 19 of ply 16. Each ply has its corners adjacent base 19 cut to conform to the shape of the bladder upon folding, with adhesive material 29 applied to the inside edge of sides 19 and 23. Before folding of ply 16, bladder 11 is folded over upon itself at base 27 so that it is not stretched or weakened when it is inflated. Then ply 16 is folded over the bladder along fold lines 31, 33 and 35 to conform to the shape of the bladder and so that one part of its long side 17 overlaps the remaining part of long side 17 and each such part extends perpendicular to base 27 of the bladder and its long side 19 overlaps the folded base of the bladder and the seam formed by the overlapping parts of side 17 of ply 16. The overlapping portions of ply 16 are then adhesively secured. Outer ply 18 is folded and secured in the same manner as inner ply 16. Each ply of paper is formed with an opening for valve 14. Preferably, each corner of the bag is provided with a tie-down 20 which is made of nylon and protrudes from the corner of the bag in the form of a loop by which the bag can be tied into place. The tie-downs are of the type disclosed in U.S. Pat. No. 4,044,693.

FIGS. 4-6 illustrate a typical application for the dunnage bag of the invention. The space left between the freight of the vehicle shown is filled or bridged by triangular dunnage bags to prevent the freight from shifting and damaging the freight and/or the vehicle. In accordance with customary practice, the height and width of the load determines the number of bags needed and each bag should be so oriented that it does not extend beyond the ladings perimeter. As shown, two bags are utilized, each being positioned in an upright position opposite and parallel to the surfaces of the freight to be shored. Preferably, buffer material 22 is employed intermediate the bags and the freight. Buffer material has two functions: it protects the air bag from abrasions and puncture by offering a smooth surface against the air bag; and it distributes the force of the air bag, preventing concentration of forces, which may cause crushing or damage to the lading. Buffer material may be rigid, such as plywood or particle board, for loads which are crushable and lack stiffness; or soft, such as corrugated, for loads which are solid, self-supporting and do not have sharp protrusions. The buffer material should be larger than the uninflated air bag and cover the entire surface of the lading. Accordingly, each air bag is sandwiched between upright sections of buffer material. Each air bag 10 is positioned so that its base is upmost and horizontally oriented and positioned contiguous to the top perimeter of the freight and its apex is positioned contiguous to the bottom perimeter of the freight. After each bag is so positioned, it is inflated with air. If desired, bags 10 may be secured to the vehicle and to each other by tie-downs 20 of the type disclosed in U.S. Pat. No. 4,044,693.

Compacting takes place during inflation. It consists of the air bag meeting and forcing back the resistance created by the surfaces of the void containing the bag. As the pressure increases in the air bag, it overcomes frictional forces, eliminating small lengthwise voids remaining in the load. In transit, longitudinal shifting of the load mostly involves the upper part of the load because the combined restraining force between the product and the sidewalls of the vehicle, together with the usual frictional forces between the pallets and the vehicle floor and the weight of the upper part of the load on the lower part, is sufficient to restrain or inhibit the lower part of the load from moving.

Because of this characteristic, the force required to cushion and reposition the lower part of the load upon impact is significantly less than that required for the upper part of the load. This signifies that uniform dissipation of the shock of impact is not needed, that the cushioning and repositioning functions of an air bag is mostly achieved by that portion of the bag contiguous to the upper part of the load and that the force required to cushion and reposition the load decreases from a maximum at the top of the load to a minimum at the bottom of the load. So an air bag of triangular shape oriented in the manner described quite adequately meets freight shoring requirements, with a significant reduction in the quantity and cost of materials utilized in the manufacture of such a bag.

I claim:

1. An inflatable dunnage bag including an airtight bladder, reinforcing material folded to conform to the shape of and enclosing the bladder, and a valve for inflating the bladder extending through the material and opening into and connected to the bladder, characterized in that the bladder is of tapered form and the reinforcing material is folded along fold lines so that the material is flat between the fold lines when the bag is uninflated to form front and back bag walls each of which is tapered in width between the fold lines.

2. An inflatable dunnage bag as recited in claim 1, in which the bladder is of triangular form.

3. An inflatable dunnage bag as recited in claim 2, in which the reinforcing material is of substantially rectangular shape and the bladder, before folding of the material, has the intersection point of two of its sides positioned inside of one of the long sides of the material and its third side extending parallel to and inside of the second long side of the material, the material being folded over the bladder to conform to the shape of the bladder and so that one part of its one long side overlaps the remaining part of its one long side and its second long side overlaps the third side of the bladder and the seam formed by the overlapping parts of the one long side of the material, the overlapping portions of the material being adhesively secured.

4. An inflatable dunnage bag as recited in claim 2, in which the reinforcing material is of substantially rectangular shape and the bladder, before folding of the material, has its apex positioned at the centerline and slightly inside of one of the long sides of the material and its base extending parallel to and slightly inside of the other long side of the material, the material being folded over the bladder to conform to the shape of the bladder and so that one part of its long side overlaps the remaining part of its one long side and each part extends perpendicular to the base of the bladder and its long side at the base of the bladder overlaps the base of the bladder and the seam formed by the overlapping parts of the one long side of the material, the overlapping portions of the material being adhesively secured.

5. An inflatable dunnage bag as recited in claim 4 in which the dunnage bag is in the shape of an isosceles triangle.

6. An inflatable dunnage bag as recited in claim 1, in which the bladder is formed by heat sealing together the edge surfaces of matching triangular flat pieces of heat sealable material.

7. An inflatable dunnage bag as recited in claim 1, in which the remaining material is formed by plies of paper superimposed one over the other and folded along fold lines so that the plies are flat between the fold lines when the bag is uninflated to form tapered front and back bag walls between the fold lines.

8. An inflatable dunnage bag having a reinforced airtight bladder and a valve for inflating the bladder, and manufactured by a process comprising forming the bladder by heat sealing together the edge surfaces of matching flat pieces of heat sealable material each of which is tapered in width, enclosing the bladder so formed with reinforcing material, folding the reinforcing material to conform to the shape of the bladder, and adhesively securing the reinforcing material so folded.

9. An inflatable dunnage bag as recited in claim 8, in which each of the flat pieces is of triangular shape.

10. An improved inflatable dunnage bag having front and back walls for shoring freight in a storage compartment wherein the freight is maintained in position by the coaction of the freight being shored, the compartment, and the dunnage bag in its inflated condition so that its front and back walls cooperate with the surfaces of the freight and of the compartment to maintain the freight in position, wherein the improved dunnage bag has front and back walls including reinforcing material enclosing an airtight bladder, each of the front and back walls is tapered in width, and the bag is positioned upright with its front and back walls disposed opposite the surfaces of the freight to be shored, with its wide end being topmost and horizontally oriented and positioned contiguous to the top perimeter of the freight, and with its narrow end being positioned contiguous to the bottom perimeter of the freight.

11. The dunnage bag of claim 10, in which the dunnage bag is in the shape of a triangle and has one of its sides topmost and horizontally oriented and positioned contiguous to the top perimeter of the freight and the intersection point of its other two sides positioned contiguous to the bottom perimeter of the freight.

12. The dunnage bag of claim 10, in which the dunnage bag is in the shape of an isosceles triangle and has its base topmost and horizontally oriented and positioned contiguous to the top perimeter of the freight and has its apex positioned contiguous to the bottom perimeter of the freight.

* * * * *